Feb. 9, 1960     J. H. WESSELS     2,924,779

STEPFUNCTION AMPLIFIER

Filed March 17, 1955

INVENTOR
JOHANNES HENDRIK WESSELS
BY
AGENT

United States Patent Office

2,924,779
STEPFUNCTION AMPLIFIER

Johannes Hendrik Wessels, Eindhoven, Netherlands, assignor, by mesne assignments, to North American Philips Company, Inc., New York, N.Y., a corporation of Delaware Application March 17, 1955, Serial No. 494,874

Claims priority, application Netherlands March 26, 1954

4 Claims. (Cl. 330—69)

This invention relates to circuits for amplifying stepfunctions, the amplifier circuit having an adjustable response. In such circuits not only the amplitude characteristic, but more particularly also the phase characteristic of the amplifier is important in order to ensure an optimum so-called stepfunction response (this is the faithfulness with which the oscillation produced across the amplifier output corresponds to a unit step supplied to the amplifier input). It is known for this purpose to utilize networks which correct the phase characteristics of the amplifier without unduly affecting its amplitude response curve.

The accurate measurement of the phase characteristic and the calculation of the required phase-correcting network from this measurement takes up comparatively much time. A simpler method is to utilize networks having an adjustable phase characteristic, which networks are so adjusted that a unit step supplied to the amplifier input produces at the amplifier output a stepfunction exhibiting approximately radial symmetry with respect to the center of the step.

The object of the invention is to provide an advantageous construction of such an adjustable network. It is characterized in that a current proportional to the input signal is supplied to a network comprising a resistor and in parallel therewith the series combination of a variable resistor and a reactance, the voltage produced in the circuit of the reactance, decreased by a voltage proportional to the said current, providing the output signal.

Figure 1:
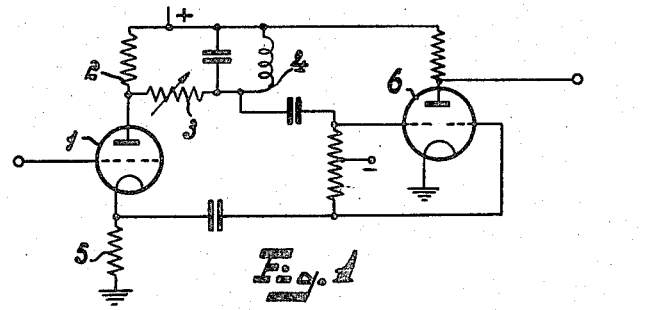
Figures 2, 3:
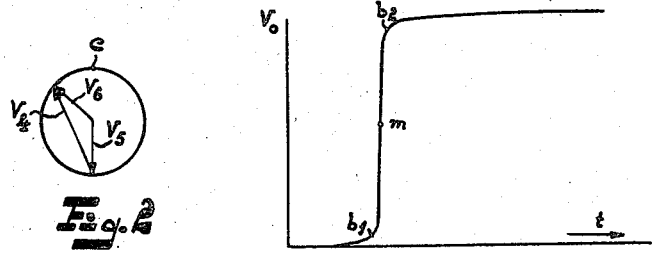
Figures 4, 5:
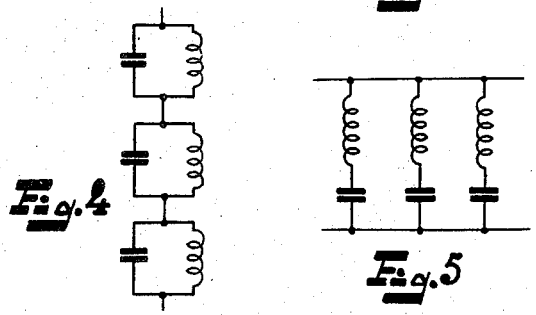
Figure 6:
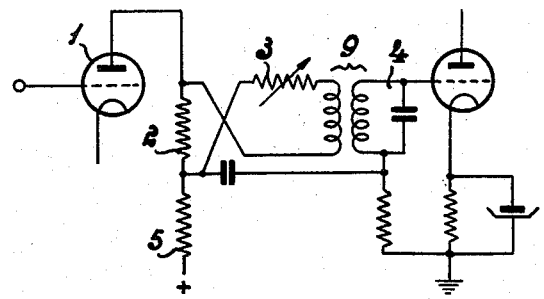

In order that the invention may be readily carried into effect, it will now be described, by way of example, with reference to the accompanying drawing in which Fig. 1 shows one embodiment of the invention, Fig. 2 shows a vector diagram, Fig. 3 shows a response curve which serves to explain Fig. 1, Figs. 4 and 5 show two alternative embodiments of the reactance of Fig. 1, and Fig. 6 is an alternative embodiment of the invention.

Referring now to Fig. 1, the step function to be amplified is supplied to the control grid of an amplifying tube 1, of which the anode circuit includes a resistor 2 having connected in parallel with it a variable resistor 3 in series with a circuit 4, and of which the cathode circuit includes a resistor 5 having half the value of resistor 2. The voltages appearing across circuit 4 and resistor 5 are added in a double tube 6, in the anode circuit of which the amplified output signal is produced.

In Fig. 2, $V_4$ and $V_5$ indicate the voltages across circuit 4 and resistor 5, respectively, for a determined frequency of the grid voltage of tube 1. When this frequency varies, the extremity of the voltage vector $V_4$ substantially traverses a circle $c$ whereas the vector $V_5$ corresponds to the radius of circle $c$ due to the said relationship between the resistors 2 and 5. Consequently, the amplitude of the output signal produced by the tube 6 and corresponding to the vector $V_6$ remains constant for a variable input frequency. In other words the amplitude curve of the amplifier 1—6 is constant.

The phase characteristic of the amplifier 1—6 is determined by the resonance frequency of the circuit 4 and by the values of the resistors 2 and 3. According to the invention, the phase characteristic may be adjusted by controlling resistor 3 without the amplitude curve substantially being influenced, since upon variation of resistor 3, the phase difference between the voltages $V_4$ and $V_5$ varies, but the extremity of the voltage vector $V_4$ and hence that of $V_6$ invariably follows the circle $c$ of Fig. 2, so that the amplitude curve remains unchanged. By suitable adjustment of resistor 3, a step-like input signal may thus be represented by an output signal $V_0$ as a function of the time $t$ (see Fig. 3), of which the bends $b_1$ and $b_2$ exhibit substantially, radial symmetry with respect to the centre $m$ of the step.

It will be evident that the response curve of Fig. 3 may be further improved by the use of more complicated reactance circuits instead of the circuit 4. Such a reactance may be constituted for example, by the series combination of a plurality of parallel resonant circuits (see Fig. 4) of which the resonance frequencies preferably constitute an arithmetic series, all capacitors of the said circuits having equal values, or it may be constituted by the corresponding parallel combination of a plurality of series resonant circuits of Fig. 5, of which the resonance frequencies, as before, constitute an arithmetic series, now all inductances of the circuits having equal values. In this case a phase characteristic substantially linearly dependent upon frequency is thus obtained, as appears from the calculation.

Instead of utilizing the double tube 6 of Fig. 1, it is also possible, for example as shown in Fig. 6, to include the resistor 5 in the anode circuit of tube 1 and to connect circuit 4 via a phase-inverting transformer 9, in series with the variable resistor 3, in parallel with the resistor 2. The voltage across the circuit 4, as before, must have exactly twice as high a value for that frequency, at which the circuit 4 has its highest impedance, and it must be in phase opposition to the voltage across resistor 5.

The circuit of Fig. 6 functions in the same manner as the circuit of Fig. 1, as follows. In both circuits, two resistors, 2 and 5, are connected in series with the current discharge path of the amplifier tube 1, and the output signal current of the amplifier appears in both of these resistors. The signal from the resistor 5 is fed, via a capacitor, to an input grid of the second tube 6. The signal from the resistor 2 is fed, via the variable resistor 3, to the reactance circuit 4, from which it is fed to an input grid of the second tube 6. In Fig. 1, the two signals are fed to two different input grids of the tube 6, and in Fig. 6 these two signals are fed to the same input grid of the tube 6.

In both Figs. 1 and 6, the two signals are fed to tube 6 with substantially opposite phases, so that a subtraction will occur. For this purpose, the phase of one of these signals is reversed with respect to the other signal. In Fig. 1, the signal current in resistor 2 inherently has a reverse phase with respect to the signal current in resistor 5. In Fig. 6, the signal currents in resistors 2 and 5 are in phase, and the phase of the signal from resistor 2 is reversed by means of the phase-inverting coupling transformer 9. By adjusting the value of the resistor 3 in either of Figs. 1 and 6, the relative phase of the two signals is adjusted, as is indicated by the vector diagram of Fig. 2, so as to produce a desired step-like response characteristic as shown in Fig. 3.

Furthermore, it is possible, for example in the example of Fig. 1, to include in addition a fixed resistor (not shown) in series with the circuit 4 and the variable resistor 3 and to supply the voltage across the series combination of the fixed resistor and the circuit 4 to the tube 6. In this case resistor 5 must have a value more than half as high as that of resistor 2.

It will be evident that pentodes or other amplifying elements, for example transistors, may be used instead of the amplifying tubes shown as triodes. Furthermore, if desired, the anode circuit of tube 6 may include, as before, a similar network 2, 3, 4 as that in the anode circuit of tube 1.

What is claimed is:

1. A circuit for amplifying stepfunctions and having an adjustable response characteristic, comprising input means for a stepfunction signal, a network comprising a resistor and connected in parallel with said resistor the series combination of a variable resistor and a reactance circuit, amplifying means for producing current flow through said network proportional to said input signal, said network being connected to and comprising an output circuit of said amplifying means, means for providing a first output voltage of one polarity and phase proportional to the said input sginal, means for providing a second output voltage proportional to the voltage across said reactance circuit, and means for combining said output voltages to reduce voltage components of said one polarity and phase thereby to produce a resultant output voltage.

2. A circuit as claimed in claim 1, in which said reactance circuit comprises a series combination of a plurality of resonant circuits each comprising an inductor and a condenser connected in parallel, and means connecting said resonant circuits in series, said condensers having equal values of capacitance, and said resonant circuits having relative values of resonance frequencies to form an arithmetic series.

3. A circuit as claimed in claim 1, in which said reactance circuit comprises a parallel combination of a plurality of resonant circuits each comprising an inductor and a condenser connected in series, and means connecting said resonant circuits in parallel, all of said inductors having the same value of inductance, and said resonant circuits having relative values of resonance frequencies to form an arithmetic series.

4. A circuit as claimed in claim 1, in which said first output circuit comprises a resistor connected in series with said second output circuit whereby said first output signal is produced across said last-named resistor.

References Cited in the file of this patent

UNITED STATES PATENTS

| | | |
|---|---|---|
| 2,226,238 | Doba | Dec. 24, 1940 |
| 2,226,459 | Bingley | Dec. 24, 1940 |
| 2,273,511 | Brück | Feb. 17, 1942 |
| 2,618,711 | Bourget | Nov. 18, 1952 |
| 2,659,775 | Coulter | Nov. 17, 1953 |
| 2,802,907 | Peterson et al. | Aug. 13, 1957 |
| 2,817,756 | Debel | Dec. 24, 1957 |